United States Patent
Inoue

(10) Patent No.: US 8,114,565 B2
(45) Date of Patent: Feb. 14, 2012

(54) TONER PRODUCTION METHOD AND TONER GRANULATING APPARATUS

(75) Inventor: Atsushi Inoue, Numazu (JP)

(73) Assignee: Ricoh Company, Ltd., Tokyo (JP)

( * ) Notice: Subject to any disclaimer, the term of this patent is extended or adjusted under 35 U.S.C. 154(b) by 132 days.

(21) Appl. No.: 12/389,908

(22) Filed: Feb. 20, 2009

(65) Prior Publication Data

US 2009/0220885 A1     Sep. 3, 2009

(30) Foreign Application Priority Data

Feb. 29, 2008  (JP) .................................. 2008-050135
Oct. 14, 2008  (JP) .................................. 2008-264996

(51) Int. Cl.
  *G03G 9/08*  (2006.01)

(52) U.S. Cl. .................. 430/137.18; 430/137.2

(58) Field of Classification Search ............. 430/137.18, 430/137.2

See application file for complete search history.

(56) References Cited

U.S. PATENT DOCUMENTS

| | | | |
|---|---|---|---|
| 6,341,889 B1 * | 1/2002 | Noda et al. ................ | 366/262 |
| 2004/0118957 A1 * | 6/2004 | Papajewski et al. .......... | 241/236 |
| 2005/0257692 A1 * | 11/2005 | Marcato ........................ | 99/353 |
| 2007/0003857 A1 * | 1/2007 | Eida et al. .................... | 430/110.4 |

FOREIGN PATENT DOCUMENTS

| | | |
|---|---|---|
| JP | 5-34976 | 2/1993 |
| JP | 6-186775 | 7/1994 |
| JP | 6-266157 | 9/1994 |
| JP | 6-266158 | 9/1994 |
| JP | 8-69123 | 3/1996 |
| JP | 2659873 | 6/1997 |
| JP | 10-161343 | 6/1998 |
| JP | 2001-255702 | 9/2001 |
| JP | 2002-72561 | 3/2002 |
| JP | 2002-131279 | 5/2002 |
| JP | 3435587 | 6/2003 |
| JP | 3456025 | 8/2003 |
| JP | 2005-49411 | 2/2005 |
| JP | 3670023 | 4/2005 |
| JP | 2006-259017 | 9/2006 |

OTHER PUBLICATIONS

Abstract of JP 06-266158, Sep. 1994.*
Machine English language translation of JP 06-266158, Sep. 1994.*

* cited by examiner

*Primary Examiner* — Hoa Le
(74) *Attorney, Agent, or Firm* — Oblon, Spivak, McClelland, Maier & Neustadt, L.L.P.

(57) ABSTRACT

Provided is a toner production method that reuses a fine particle toner having a particle diameter failing to meet a predetermined standard diameter which is generated in pulverizing and classifying processes carried out for a toner material including at least a binder resin, release agent and pigment. The method includes granulating the fine particle toner by means of a granulating apparatus so as to increase a loose apparent density of the fine particle toner from the range of 0.05 g/cc to 0.25 g/cc to the range of 0.30 g/cc to 0.60 g/cc, in which wherein the granulating apparatus contains two left and right press rolls having the same diameters, the two press rolls having a rotational speed ratio of 0.40 to 0.95.

17 Claims, 1 Drawing Sheet

TONER PRODUCTION METHOD AND TONER GRANULATING APPARATUS

BACKGROUND OF THE INVENTION

1. Field of the Invention

The present invention relates to a method for producing a toner for use in image forming methods such as an electrophotographic method, a latent electrostatic recording method, a latent electrostatic printing method, a toner jet system recording method, and the like.

2. Description of the Related Art

A toner for developing a latent electrostatic image is used in image forming methods such as an electrophotographic method.

A production method of such a toner is roughly divided into a pulverization method and polymerization method, and the pulverization method is known as a simpler and more popular method.

In the pulverization method, a binder resin for fixing the toner to a transfer material and a colorant are used, and, if necessary, other materials such as a charge control agent, magnetic material, and a release agent are used. These toner materials are mixed and subjected to melting and kneading. Subsequent to cooling down and solidification, the kneaded mixture is finely pulverized by a pulverizer unit and then the resultant is classified by a classifier unit according to a desired particle size distribution. After that, a fluidizer, etc. is added to the resultant, whereby a toner for image formation is produced. Recently, to meet the demands for high-speed printing, high resolution and the like, such a toner including a resin having a low melting point and a release agent, typically a wax, and having a smaller particle size has been dominant in the market.

In a toner production method using such toner materials, fine particle toner (so called substandard toner) whose particle size is less than a predetermined size is generated in the pulverizing and classifying process. The fine particle toner thus generated is collected for reuse.

For achievement of collection and reuse of such a fine particle toner, there are known a method of recycling the substandard toner to a material mixing process (also referred to as mixing process), and a method of introducing the collected substandard toner in a granulating apparatus, followed by pressurizing at a predetermined pressure, granulating, and then mixing with materials in a mixing process, and the like.

For example, the following inventions have been proposed relating to the above methods. Japanese Patent Application Laid-Open (JP-A) No. 05-034976 discloses a method in which the substandard toner is added to a dispersed mixture obtained in a dispersing and mixing process so as to be reused.

JP-A No. 06-186775 discloses a method in which the fine particle toner is uniformly sprinkled onto intermediate products of the toner after a kneading process, dissolved by the heat retained in the intermediate products of the toner, and subjected to cooling and pulverizing, whereby a toner product having a predetermined grain size is regenerated.

JP-A No. 08-069126 discloses a method in which, a kneading process for the fine particle toner is provided separately from a normal toner production process through which a batch-type and continuous-type extruder with single or double-shaft feed screws, which is the same one used in the normal toner production process and, after that, followed by the normal toner production process or the resultant fine particle toner is processed into a coarse powder, followed by coarse pulverizing process.

JP-A No. 10-161343 discloses a method in which the fine particle toner collected and discharged through a classifying process is heated to be melted or softened, the melted or softened substance is extruded by a pressure extruder, and the extruded substance then is mixed into a kneaded substance before cooling after a kneading process.

Further, as a method of granulating the fine particle toner using a granulating apparatus, JP-A No. 06-266157 discloses a toner manufacturing method using a granulating apparatus.

JP-A No. 2006-259017 discloses a method that uses a degasifier for increasing the bulk density of the fine particle toner before a granulation process.

Japanese Patent (JP-B) No. 3435587 discloses a method in which both granulated fine particles and raw fine particles which is not granulated are reused.

However, in the toner recycle technique disclosed in JP-A No. 05-034976, breakage of resin molecule occurs when the fine particle toner is re-kneaded by a kneader. This may reduce the molecular weight of the resin to cause fixing performance to deteriorate or may reduce mechanical strength thereof to cause durability performance to deteriorate.

Further, in the method disclosed in JP-A No. 06-186775, except for the case where the amount of the fine particle toner to be sprinkled is extremely small, the fine particle toner is merely adhered to the surface of pellet-shaped intermediate products of the toner. In this state, a kneaded substance and fine particle toner are not integrated with each other. As a result, the resultant toner easily rubs off. This is caused due to a low heat exchange rate between the kneaded substance and fine particle toner. The fine particle toner other than that having a low softening point is not melted and softened and, therefore, it is difficult to increase the amount of the fine particle toner to be used.

Further, in the method disclosed in JP-A No. 08-069126, when a large amount of fine particle toner having a particle diameter of 5 μm or less exists, so-called "feed-neck" phenomenon that the powder cannot be fed into an extruder well occurs. As a result, the fine particle toner having a particle diameter of 5 μm or less cannot be quantitatively supplied to the extruder.

Further, in the invention disclosed in JP-A No. 10-161343, energy loss occurs since an electric power is required when a pressure extruder is heated using a heater. Further, a substance softened and/or melted by heating remains in a vessel and is not completely discharged from the apparatus, and a maintenance work for removing the residue needs to be carried out every time one process is completed or before activation of the apparatus after the stop thereof.

Especially, in a toner production method in which a toner material including a binder resin, release agent, and pigment are mixed followed by kneading, pulverizing, and classifying, when the substandard fine particle toner generated in the classifying process is directly subjected to the mixing process, the following problems arise.

That is, the toner produced in a state where the feed-neck phenomenon that the substandard fine particle toner does not bite into the screw portion of a kneader well occurs does not reach a sufficient mixing state as compared to the toner in which the recycled fine particle toner is not used, deteriorating dispersibility of the material. Due to the deterioration in the dispersibility of the material and occurrence of the feed-neck phenomenon, the discharge amount from the kneader becomes extremely small, thereby reducing producing capability.

In the method disclosed in JP-A No. 2006-259017 aiming to solve such a problem, there is a limit on the improvement in productivity.

Especially, also in the granulating process disclosed in JP-A No. 06-266157, granulating capability for the fine particle toner containing carbon black having lubricant effect is low. Therefore, in order to maintain production volume, the number of kneader needs to be increased from the current one. Further, also in the method disclosed in JP-A No. 2006-259017, degassing is carried out in the granulating process, and it can easily be estimated that degassing effect in the hopper of the granulating apparatus for the toner containing carbon black having high lubricant effect is reduced. Accordingly, the granulating capability may be extremely deteriorated. If the granulating capability obtained in this method is applied to the apparatus, the size of the apparatus is increased and, accordingly a space for use in producing the toner is increased, resulting in deterioration of industrial practicality. Further, even if the degassing effect is sufficient in the initial stage, it is gradually reduced due to clogging of the degassing part and the like, making it difficult to constantly obtain a predetermined granulated product. Therefore, a periodical maintenance work needs to be carried out for the degassing part, and further, a cumbersome work is required in order to maintain the granulation performance at a constant level, causing deterioration of productivity and increase in cost, which severely limits its industrial applicability.

Further, while production of a small diameter toner or release agent containing toner is required in recent years as described above, a problem of adherence of a fine particle toner or fusion bonding and adherence of a component such as wax to the inside of the pulverizer and classifier arises. Especially, the toner adherence and toner fusion bonding occur notably in the release agent containing toner, extremely deteriorating toner productivity.

Also in the method disclosed in JP-B No. 3435587, the substandard fine particle toner generated in the above production processes contains silica having high lubricant effect. In the case where the fine particle toner containing silica having high lubricant effect or fine particle toner containing carbon black is directly recycled to a material mixing process, so-called feed-neck phenomenon that the mixed material does not bite into an extruder well occurs. This impedes the progress of the kneading process to significantly deteriorate productivity. Even if a delay of the production process does not occur in the initial state of the kneading process, the delay gradually emerges, resulting in a significant reduction in the productivity.

As described above, there has been proposed no solution for preventing occurrence of the feed-neck phenomenon while obtaining a predetermined particle bulk density when the fine particle toner is granulated using the granulating apparatus employed in the methods described above. Especially, the above methods do not mention how a granulating apparatus is configured and what conditions under which the toner production process is carried out in order to achieve a predetermined particle bulk density, to prevent the feed-neck phenomenon, and to basically omit a maintenance work for an apparatus to be employed. In addition, the above methods do not mention a technique that sets the speed ratio of two press rolls which is proposed in the present invention. Further, an invention that can lead to mass production techniques as the present invention does has not yet been disclosed.

BRIEF SUMMARY OF THE INVENTION

An object of the present invention is to provide a method for granulating a toner and a toner granulating apparatus capable of achieving significantly increasing productivity and stably maintaining the high productivity without strengthening productive facilities by using a compact and low-cost granulating apparatus with less maintenances, even when a fine particle toner containing additive such as carbon black or silica having high lubricant effect, or normal fine particle toner is used.

<1> A toner production method for reusing a fine particle toner having a particle diameter failing to meet a predetermined standard diameter which is generated in pulverizing and classifying processes carried out for a toner material including at least a binder resin, a release agent and a pigment, the method including: granulating the fine particle toner by means of a granulating apparatus so as to increase a loose apparent density of the fine particle toner from the range of 0.05 g/cc to 0.25 g/cc to the range of 0.30 g/cc to 0.60 g/cc, in which the granulating apparatus contains two left and right press rolls having the same diameters, the two press rolls having a rotational speed ratio thereof of 0.40 to 0.95.

<2> The toner production method according to <1>, in which the press rolls being driven at a higher speed than the other has a rotational speed of 20 rpm or less, and the two press rolls are inwardly rotated in such a direction as to press out the fine particle toner from a top to bottom direction relative to the two press rolls.

<3> The toner production method according to <1>, wherein the press rolls being driven at a higher speed than the other has a rotational speed of 10 rpm or less, and the two press rolls are inwardly rotated in such a direction as to press out the fine particle toner from a top to bottom direction relative to the two press rolls.

<4> The toner production method according to <2> or <3>, in which the granulating apparatus further contains scrapers respectively disposed at lower portions of the two press rolls so as to press the two press rolls, and the granulating is feeding the fine particle toner between the two press rolls, pressing the fine particle toner out from the two press rolls, scraping the fine particle toner from the two press rolls from the two press rolls, pulverizing the fine particle toner scraped from the two press rolls by means of a pulverizer, and sizing the pulverized toner by means of a particle sizer so as to produce a toner.

<5> The toner production method according to any of <1> to <4>, in which a ratio $\rho 2/\rho 1$ is more than 1.2 where $\rho 1$ is a loose apparent density of the granulated fine particle toner before the granulating and $\rho 2$ is a loose apparent density of the fine particle toner after the granulating, and the two press rolls have diameters of 100 mm to 600 mm.

<6> The toner production method according to any of <1> to <5>, in which the granulating apparatus further contains a hopper which contains a fine particle supply tube, an agitator, and a screw, and in which the fine particle supply tube is configured so that the fine particle toner is introduced into the hopper through the fine particle supply tube and is disposed at an upper portion of the hopper, and the agitator and the screw are disposed inside of the hopper.

<7> A toner granulating apparatus containing: a hopper comprising a fine particle supply tube through which the fine particle toner is introduced and disposed at an upper portion thereof and an agitator and a screw disposed inside thereof; two press rolls having the same diameters, being disposed in parallel to each other; scrapers respectively disposed at the lower portions of the two press rolls so as to respectively press the press rolls, a pulverizer; and a particle sizer, wherein the two press rolls have a rotational speed ratio of 0.40 to 0.95, the press roll which is driven at a higher speed than the other has a rotational speed of 20 rpm or less, and the two press rolls are configured to have different rotational speeds based on the rotational speed ratio, and in which the two press rolls are inwardly rotated in such a direction as to press out the fine particle toner from a top to bottom direction relative to the two press rolls, the scrapers are configured to scrape the fine particle toner from the two press rolls, the pulverizer is configured to pulverize the scraped fine particle toner, and the particle sizer is configured to size the pulverized fine particle toner so as to increase a loose apparent density of the fine particle toner from the range of 0.05 g/cc to 0.25 g/cc to the range of 0.30 g/cc to 0.60 g/cc.

<8> The toner granulating apparatus according to <7>, further containing a drive unit configured to independently drive the two press rolls or a speed change unit configured to control the two press rolls so as to achieve the rotational speed ratio.

<9> The toner granulating apparatus according to <7> or <8>, wherein the screw, the agitator, the pulverizer and the particle sizer are all configured so that rotational speeds thereof are arbitrarily set.

By using a granulating apparatus according to the present invention, a fine particle toner containing carbon black or silica having lubricant effect, as well as a normal fine particle toner stably bites into the two press rolls by out of synchronization of rotation between the two press rolls. Thus, it is possible to obtain a granulated toner extremely stable in quality and to provide a toner production method and a toner granulating apparatus capable of attaining high productivity.

Further, since the quality of a granulated toner can be guaranteed over a long period of time, it can be said that it is possible to provide a toner production method capable of producing a fine particle toner with high processing power and producing a toner granulated with high yield and toner production facilities.

Further, in the toner production method according to the present invention, maintenance of equipment to be used can be saved. Further, a degassing unit or both a pressure means for pressing the press roll section and heater means for heating the press roll section can be omitted. Further, a V-shaped grove or concave groove need not be formed on the surface of the two press rolls serving as a means for biting the fine particle toner, resulting in energy saving and cost reduction.

DETAILED DESCRIPTION OF THE INVENTION

Figure 1:
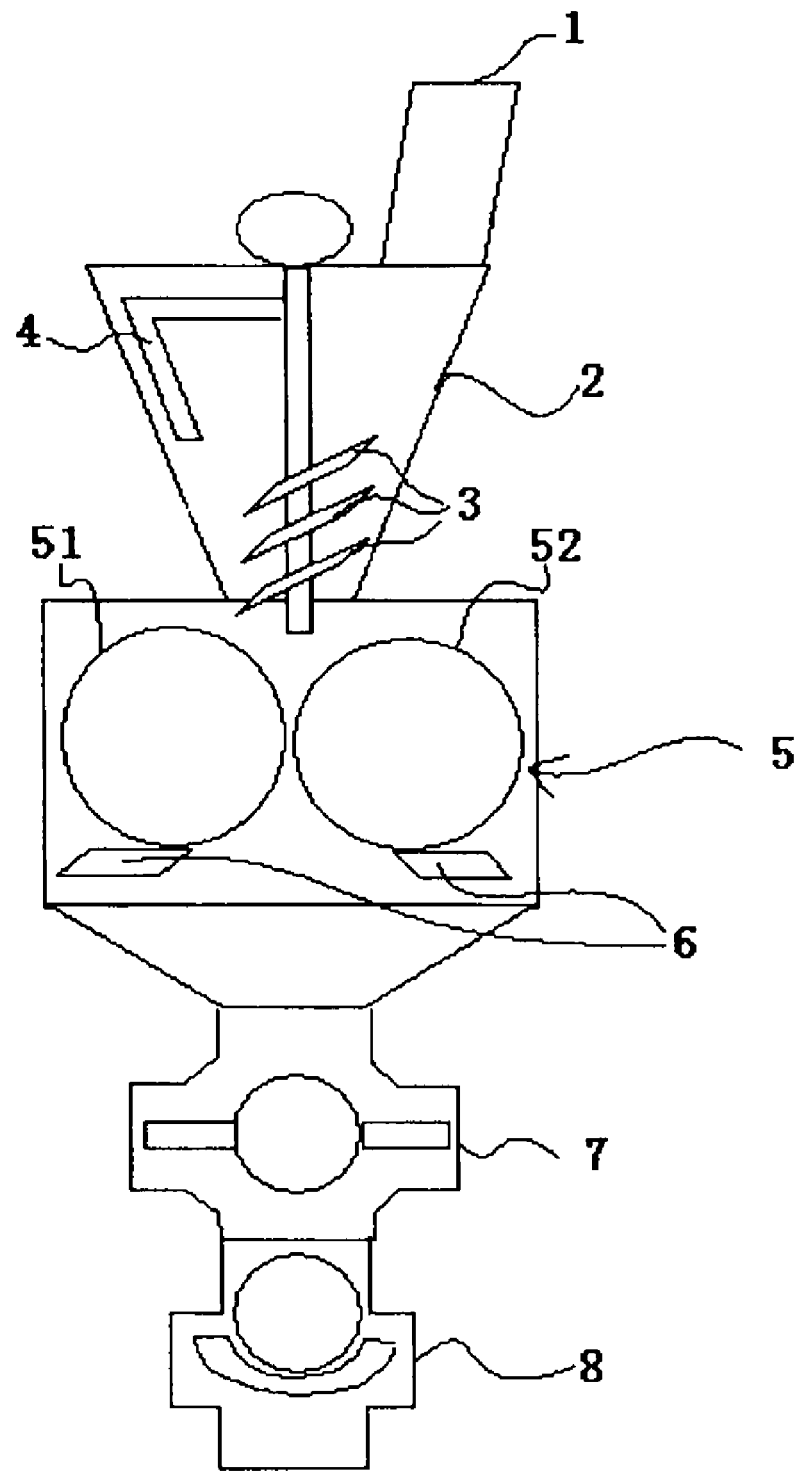
FIG. 1 is a view for explaining an entire configuration of an preferable example of a granulating apparatus for use in a toner production method according to the present invention.

The present invention relates to a toner production method that reuses a fine particle toner having a particle diameter failing to meet a predetermined standard diameter which is generated in pulverizing and classifying process following processes of mixing (mixing and stirring), kneading (melting and kneading), and cooling carried out for toner material including at least a binder resin, release agent and pigment.

[Processes of Mixing and Stirring, Melting and Kneading, Pulverizing, and Classifying]

Processing of mixing and stirring, melting and kneading, pulverizing, and classifying can be carried out in the same manner as conventionally known methods, and the same apparatuses as those used in the conventionally known methods can be used to carry out the above processes.

In the mixing process, (also referred to as mixing and stirring process), a general mixer with rotating blades is used to mechanically mix the toner material containing a binder resin, colorant such as pigment, and the like. Such a mixing and stirring process can be carried out under normal conditions without any particular limitation.

In the subsequent kneading process (melting and kneading process), the mixture obtained in the above mixing and stirring process is melted and kneaded using a kneader. The kneader may be a single-screw or double-screw continuous kneader or a batch kneader such as a roll mill mixer. Examples thereof include Model KTK double screw extruder (by Kobe Steel, Ltd.), Model TEM extruder (by Toshiba Machine Co., Ltd.), double screw extruders (by KCK Co., Ltd.), Model PCM double screw extruder (by Ikegai Tekko Co., Ltd.), and co-kneaders (by Buss Co., Ltd.).

This melting and kneading process is preferably carried out under proper conditions so as not to cause breakage of the molecular chain of the binder resin. Specifically, the melting and kneading temperature is set with reference to the softening point of the binder resin. When the melting and kneading temperature is excessively lower than the softening point, dispersion may not proceed. On the other hand, when the melting and kneading temperature is excessively higher than the softening point, severe breakage occurs.

In the pulverizing process, the kneaded mixture obtained in the melting and kneading process is pulverized. In this pulverizing process, it is preferred that the kneaded mixture is coarsely pulverized and then finely pulverized. In this case, it is possible to preferably use a system in which the kneaded mixture is pulverized by colliding against an impact plate in a jet stream, or pulverized in a narrow gap between a rotor rotating mechanically and a stator.

After completion of the pulverizing process, the pulverized material is classified in an air stream by a centrifugal force to prepare a toner (developer) having a predetermined particle diameter, e.g., an average particle diameter of from 3 µm to 20 µm. Although this toner can directly be used as developer, the roundness of the pulverized toner may be increased to a range from 0.94 to 0.99 using a power treatment apparatus such as "Therfusion System" manufactured by Hosokawa Micron Corporation or Hybridizer (made by Nara Kikai Seisakusho Co., Ltd.).

The toner production method according to the present invention is featured in that, in a method of granulating a toner for use in an electrophotographic method, a granulating apparatus having two or more, preferably, two press rolls which are disposed left and right at the middle portion of the granulating apparatus and whose rotational speeds are different from each other is used to granulate a toner. It is preferable that the two press rolls used in the granulating apparatus employed in the toner production method according to the present invention are controlled to be driven in an independent manner. To achieve this, drive units (motors) that use an inverter to drive the press rolls are independently controlled. The rotational speed set in the drive units can freely be changed by operation on a touch panel. Alternatively, in the case where Ringcone continuously variable transmission is used as a speed changer, the rotational speed can be set or changed through setting buttons, select switches, or the like provided on the speed changer.

In the case where a material for which an optimal rotational speed ratio between the two press rolls has been known is used, a common drive unit can be used by setting the rotational speed ratio using a speed changer (e.g., gear).

Hereinafter, an embodiment of the toner production method according to the present invention will be described with reference to the accompanying drawings.

[Granulating Apparatus]

FIG. 1 is an overall view of a preferable example of a toner granulating apparatus for used in the toner production method according to the present invention. Fine particles (fine particle toner) are supplied though a supply port (fine particle toner supply tube) 1 arranged at an upper portion of a hopper 2, and then stored in the hopper 2.

The fine particles stored in the hopper 2 are forcibly fed to a press roll section 5 by a rotation of a screw 3 and a agitator 4.

Although the screw 3 and agitator 4 are coaxially driven in the granulating apparatus used in the toner production method according to the present invention, they may be driven independently.

As shown in FIG. 1, the press roll section 5 preferably includes a press roll 51 and a press roll 52 having the same diameters. The press rolls 51 and 52 rotate at a rotational speed arbitrarily set by independent drive units to press the fine particles. More specifically, not shown drive units (motors) are provided independently of each other. The drive units each have a speed changer to rotate the press rolls 51 and 52. This configuration allows finer adjustment of the rotational speeds of the respective press rolls, as compared with a case where a single drive unit provided with a fixed gear is used to drive the two press rolls 51 and 52. This prevents occurrence of the feed-neck of the fine particle toner and prevents small lumps from being generated in the granulated toner. Thus, there is no danger that the future growth of the core of the lump, so that the quality of the toner can be guaranteed over a long period of time. Further, it is possible to prevent occurrence of a problem, arising when a single drive unit is used to drive the press rolls 51 and 52, where a condition of the fine particles changes to generate a noise component in the toner or deterioration of the performance of the toner to be obtained due to mixture of the toner containing the noise component with a normal fine particle toner.

The two press rolls 51 and 52 are of energy-saving type. More specifically, a hydraulic pressure means for adjusting the gap between the rolls 51 and 52 and a heater means are omitted. With this configuration, it is possible to prevent occurrence of breakage of the molecular chains of the binder resin and deterioration of toner performance. Further, cost and installation space of facilities employed in a toner production process are reduced and, further, the heater means is not provided, so that it can be said that the granulating apparatus of the present invention is an environmentally-preferred apparatus. As the speed changer, an inverter speed changer that can directly change the rotational speed of the drive unit or a speed changer that can extremely suppress a reduction of the torque transmitted from the drive unit, such as Ringcone continuously variable transmission, may be used, as described above. However, if two press rolls are allowed to rotate in a condition where they are not influenced by irregularity of the rotational speed caused by a drive means, the two press rolls can be driven by a common drive means.

As described above, independent drive units are provided for respective two press rolls to generate a difference in the rotational speed between them. The rotational speed ratio between the press rolls is set in the range of 0.45 to 0.95, preferably in the range of 0.50 to 0.90, and more preferably in the range of 0.75 to 0.85. When the rotational speed ratio between the press rolls is less than 0.40, fine particle toner bites into one of press rolls whose rotational speed is lower than that of the other, making it difficult to produce a desired granulated product and significantly deteriorating the productivity. When the rotational speed ratio between the press rolls is higher than 0.95, the biting of the fine toner particles becomes insufficient, making it difficult to produce a desired granulated product. The rotational speed is preferably set to 20 r/min (20 rpm) or less and more preferably to 10 r/min (10 rpm) or less. Especially, the two press rolls are preferably inwardly rotated in such a direction as to press out the fine particle toner from the top to bottom direction relative to the two press rolls so as to cause the fine particle toner to bite into the two press rolls. To this end, the distance between the press rolls 51 and 52 is set in the range of, e.g., 500 μm to 2000 μm, and preferably in a range of 800 μm to 1200 μm. This prevents occurrence of the feed-neck of the fine particle toner to be fed as much as possible, thereby creating a favorable advantage for the toner production method of the present invention. The diameter of the two press rolls having substantially the same diameter is set in the range of 100 mm to 600 mm, preferably in the range of 150 mm to 500 mm, and more preferably in the range of 150 mm to 300 mm. In the case where a common drive means using a gear as a speed changer is used to drive the two press rolls, the gear ratio is set in a range of 1:0.4 to 1:0.95 (higher speed gear is set to 1), preferably set in a range of 1:0.5 to 1:0.9, and more preferably in a range of 1:0.75 to 1:0.85.

The fine particle toner pressed in and passed through the press roll section 5 is scraped off from the press rolls 51 and 52 by a scraper 6 and drop to a pulverizer 7 by its own weight. The pressed fine particle toner that has passed through the pulverizer 7 is fed to a particle sizer 8 where a toner having a predetermined particle size is selected and discharged. The discharged toner is collected as a granulated product or fed to the subsequent process. The rotation speed of the pulverizer 7 and particle sizer 8 is not especially limited, and it is sufficient for the pulverizer 7 and particle sizer 8 to operate at a regular rotational speed (e.g., 100 rpm or more).

The rotation speeds of the respective units of the granulating apparatus, including the press rolls, can be arbitrarily set by inverter control, and optimum production conditions can easily be set in accordance with the type of the fine particles by operation on a touch panel.

[Release Agent]

Examples of the release agent used in the present invention include natural waxes such as candelilla wax, carnauba wax, and rice wax; montan wax, paraffin wax, sazol wax, low molecular weight polyethylene, low molecular weight polypropylene, and alkyl phosphate ester. From these release agents, an appropriate release agent can be selected in accordance with the kind of binder resin and the kind of material used for the surface portion of an image fixing roller. It is preferable that the release agent have a melting point in the range of 65° C. to 90° C. When the melting point of the release agent is lower than 65° C., blocking of toner tends to occur during the storage thereof. When the melting point of the release agent is higher than 90° C., the off-set phenomenon tends to easily take place if the image fixing roller is in a low temperature range.

As the coloring agent for use in the present invention, known pigments can be employed.

Examples of black pigment include carbon black, oil furnace black, channel black, lamp back, Azine dyes such as aniline black, metallic salt azo dyes, metallic oxides, and composite metallic oxides.

Examples of yellow pigment include Cadmium Yellow, Mineral Fast Yellow, Nickel Titan Yellow, Naples Yellow, Naphthol Yellow S, Hansa Yellow G, Hansa Yellow 10G, Benzidine Yellow GR, Quinoline Yellow Lake, Permanent Yellow NCG, and Tartrazine Lake.

Examples of the red pigment include colcothar, Cadmium Red, Permanent Red 4R, Lithol Red, Pyrazolone Red, Lake Red D, Brilliant Carmine 6B, Eosine Lake, Rhodamine Lake B, Alizarine Lake, and Brilliant Carmine 3B.

Examples of the blue pigment include Cobalt Blue, Alkali Blue, Victoria Blue Lake, Phthalocyanine Blue, metal-free Phthalocyanine Blue, Phthalocyanine Blue partially chlorinated, Fast Sky Blue and Indanthrene Blue BC.

These pigments are all dried pigment particles and can be employed alone or in combination.

[Binder Resin]

As the binder resin for use in the present invention, known resins such as a vinyl resin, a polyester resin, and a polyol resin may be used. These resins may be used either singly or as mixtures. Among them, a polyester resin, and a polyol resin are preferably used.

Examples of the vinyl resin include homopolymers of styrene and substituted styrenes such as polystyrene, poly-p-chlorostyrene, and polyvinyl toluene; styrene-based copolymers such as styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloro methacrylate copolymer, styrene-acrylonitrile copolymer, styrene-vinylmethyl ether copolymer, styrene-vinylethyl ether copolymer, styrene-maleic acid copolymer, and styrene-maleic acid ester copolymer; and poly(methyl methacrylate), poly(butyl methacrylate), polyvinyl chloride, and polyvinyl acetate.

The polyester resin serving as the binder resin can be prepared by condensation polymerization using a dihydric alcohol component selected from the following group A and a dibasic acid component selected from the following group B. Furthermore, a polyhydric alcohol having three or more hydroxyl groups, or a polycarboxylic acid having three or more carboxyl groups selected from the following group C may be added to the above-mentioned components A and B.

Group A: ethylene glycol, triethylene glycol, 1,2-propylene glycol, 1,3-propylene glycol, 1,4-butanediol, neopentyl glycol, 1,4-butenediol, 1,4-bis(hydroxymethyl)cyclohexane, bisphenol A, hydrogenated bisphenol A, a reaction product of polyoxyethylene and bisphenol A, polyoxypropylene(2,2)-2,2-bis(4-hydroxyphenyl)propane, and polyoxypropylene(3,3)-2,2-bis(4-hydroxyphenyl)propane.

Group B: maleic acid, fumaric acid, mesaconic acid, citraconic acid, itaconic acid, glutaconic acid, phthalic acid, isophthalic acid, terephthalic acid, cyclohexane-dicarboxylic acid, succinic acid, adipic acid, sebacic acid, malonic acid, linolenic acid; anhydrides of the above acids; and esters of the above acids and a lower alcohol.

Group C: polyhydric alcohols having three or more hydroxyl groups, such as glycerin, trimethylolpropane, and pentaerythritol; and polycarboxylic acids having three or more carboxyl groups, such as trimellitic acid and pyromellitic acid.

The polyol resin, which is preferably used as the binder resin for the toner of the present invention, is prepared by allowing the following components to react: an epoxy resin, an alkylene oxide adduct of a dihydric phenol or a glycidyl ether of the alkylene oxide adduct; a compound having in the molecule thereof one active hydrogen atom which is capable of reacting with epoxy group; and a compound having in the molecule thereof two or more active hydrogen atoms which are capable of reacting with epoxy group. The above-mentioned resins may be used together with the other resins, for example, epoxy resin, polyamide resin, urethane resin, phenolic resin, butyral resin, rosin, modified rosin, and terpene resin when necessary. As the aforementioned epoxy resin, a polycondensation product of a bisphenol such as bisphenol A or bisphenol F and epichlorohydrin is a representative example.

[Charge Control Agent]

A charge control agent is preferably incorporated in the toner particles (internal addition), or may be mixed with the toner particles (external addition).

Examples of a charge control agent may include: nigrosine, azine dyes having 2-16 carbon atoms (Japanese Patent Application Publication (JP-B) No. 42-1627); basic dyes including, e.g., C.I. Basic Yellow 2 (C.I. 41000), C.I. Basic Yellow 3, C.I. Basic Red 1, C.I. Basic Red 9 (C.I. 42500), C.I. Basic Violet 1 (C.I. 42535), C.I. Basic Violet 3 (C.I. 42555), C.I. Basic Violet 10 (C.I. 45170), C.I. Basic Violet 14 (C.I. 42510), C.I. Basic Blue 1 (C.I. 42025), C.I. Basic Blue 3 (C.I. 51005), C.I. Basic Blue 5 (C.I. 42140), C.I. Basic Blue 7 (C.I. 42595), C.I. Basic Blue 9 (C.I. 52015), C.I. Basic Blue 24 (C.I. 52030), C.I. Basic Blue 25 (C.I. 52025), C.I. Basic Green 4 (C.I. 42000), and lake pigments formed from these basic dyes with laking agents; C.I. Solvent Black 8 (C.I. 26150); quarternary ammonium chlorides, such as benzomethyl-hexadecylammonium chloride and decyl-trimethylammonium chloride; dialkyltin compounds such as dibutyl and dioctyl; dialkyltin borate compounds; guanidine derivatives; polyamine resins such as a vinyl polymer containing an amino group and a condensation-type polymer containing an amino group; metal complexes of monoazo dye disclosed in JP-B Nos. 41-20153, 43-27596, 44-6397, and 45-26478; metal complexes of Zn, Al, Co, Cr, and Fe with salicylic acid, dialkyl-salicylic acid, naphthoic acid, or dicarboxylic acid disclosed in JP-B Nos. 55-42752 and 59-7385; and a sulphonated copper phthalocyanine pigment.

The toner produced in the present invention may be used as a one-component developer or two-component developer. In the case where the toner is used as a two-component developer, it is mixed with carrier particles. As the carrier particle, a magnetic particle such as iron powder, ferrite powder, nickel powder, magnetite powder, a resin-coated carrier in which the surface of magnetic particles is coated with a resin such as a fluorine-based resin, a vinyl-based resin, or a silicone-based resin, and a magnetic material dispersion-type carrier in which magnetic particles are dispersed in a resin. The carrier preferably has an average particle diameter of 30 μm to 80 μm.

In order to improve fluidity, developing performance, transfer performance, inorganic fine particles may be externally added to the toner. Examples of the inorganic fine particles include oxides and composite oxides of one or more of Si, Ti, Al, Mg, Ca, Sr, Ba, In, Ga, Ni, Mn, W, Fe, Co, Zn, Cr, Mo, Cu, Ag, and V are useful. Of these inorganic fine particles, fine particles of silicon dioxide (silica), titanium dioxide and alumina are preferably used. Further, the above-mentioned inorganic fine particles are preferably surface-treated with hydrophobized agent.

EXAMPLES

The present invention will be explained more specifically with reference to examples. However, the scope of the present invention is not limited to the following examples. In the description below, parts are represented in parts by mass.

First, loose apparent density will be described as the property of the fine particle toner and granulated product. The loose apparent density was measured according to the following method using a graduated cylinder.

1) Prepare 50 ml vessel and measure a mass A of the vessel (g)

2) Prepare funnel having an outlet diameter of 10 mm, a height of 60 mm, and an inlet diameter of 60 mm 3) Fill the 50 ml (=50 cc) vessel with the fine particle toner or granulated product which is a sample for measuring the loose apparent density through the funnel until the fine particle toner or granulated product spills out of the funnel 4) Stop the filling procedure when the granulated product spills out of the vessel and uses a scraper to scrape extra sample, followed by measurement of a mass B (g)

5) Calculate (B-A)/50 cc in 1) based on the mass measured in 4) to obtain bulk density (g/cc) (=result C g/cc)

6) Multiply the result (C g/cc in 5)) by a coefficient 1.8 to calculate loose apparent density For example, measurement value of the bulk density of toner having a loose apparent density of 0.410 g/cc is 0.228 g/cc (0.410÷1.8=0.228 (the number of significant figures is set to 3)).

Toner Material in Examples 1 to 5 and Comparative Examples 1 and 2

| | |
|---|---|
| Binder resin: polyester resin | 100 parts |
| Charge control agent: zinc salt of 3,5 di-tert-butyl salicylic acid | 2 parts |
| Release agent: carnauba wax | 3 parts |
| Pigment: C.I. pigment yellow 180 | 5 parts |

The above toner material was melted and kneaded in a kneader, cooled and solidified, and coarsely pulverized, followed by (finely) pulverizing the resultant material using a jet mill and classifying the pulverized material. Then, 300 kg fine particle toner generated when a toner product having a volume-average particle diameter of 8.5 μm (volume-average particle diameter measured by Multisizer) is obtained was prepared. Further, 0.6 parts or 1.0 part of hydrophobic silica having a nominal volume-average particle diameter of 10 nm was added to 100 parts of the fine particle toner, followed by intentional mixing to obtain sample 1 to be used in the following examples (Comparative example 1, Examples 1 to 3, comparative example 2, and Examples 4 to 5: Table 1).

Toner Material in Examples 6 to 8 and Comparative Example 3

| | |
|---|---|
| Binder resin: polyester resin | 100 parts |
| Charge control agent: zinc salt of 3,5 di-tert-butyl salicylic acid | 2 parts |
| Release agent: carnauba wax | 3 parts |
| Pigment: carbon black | 3.5 parts |

The above toner material was melted and kneaded in a kneader, cooled and solidified, and coarsely pulverized, followed by (finely) pulverizing the resultant material using a jet mill and classifying the pulverized material. Then, 300 kg fine particle toner generated when a toner product having a volume-average particle diameter of 8.5 μm (volume-average particle diameter measured by Multisizer) is obtained was prepared. Further, 3.5 parts of carbon black having a nominal volume-average particle diameter of 10 nm was added to 100 parts of the fine particle toner, followed by intentional mixing to obtain sample 2 to be used in the following examples (Comparative example 3 and Examples 6 to 8: Table 2).

<Example of Granulating Process>

The above two types of fine particle toners (samples 1 and 2) were granulated using the granulating apparatus shown in FIG. 1 under the following conditions and conditions shown in Tables 1 to 3 and then evaluated based on the criteria shown in Table 4. The press rolls 51 and 52 of the granulating apparatus used here have the same roll diameter of 230 mm and same roll width of 230 mm, and the distance between the rolls 51 and 52 is 1000 μm. In the following examples and Comparative examples, about half (75 mm) of the entire width of each press roll is used as an effective width in a steady state where two press rolls are driven at different speeds. Guides are provided at both ends of each press roll so as to define the effective width.

Conditions and Results are shown in Tables 1 to 3. Table 1 shows the conditions and results in Examples and Comparative examples using the fine toner particles containing silica. Table 2 shows the conditions and results in Examples and Comparative example using the fine particle toner to which carbon black has externally been added. The "Roll rotational speed" in Tables means the rotational speed of the press rolls and "Roll rotational speed ratio" means the ratio of rotational speed between the press rolls. Further, in Tables 1 and 2, "Ratio of loose apparent density before and after granulation" in the "Result" field represents a value (*2/*1) obtained by dividing the ratio of loose apparent density after granulation (*2) by the ratio of loose apparent density before granulation (*1). Table 3 shows conditions of a pulverizer and particle sizer in Examples and Comparative examples. Table 4 shows the criterion for three-level evaluation of toner material biting property in Tables 1 and 2.

TABLE 1

| | | Comparative Example 1 | Example 1 | Example 2 | Example 3 | Comparative Example 2 | Example 4 | Example 5 |
|---|---|---|---|---|---|---|---|---|
| Condition | Parts by weight of silica (based on 100 parts by weight of fine particles) | | 0.6 | | | | 1.0 | |
| | Loose apparent density of fine particle toner (g/cc)*1 | | 0.19 | | | | 0.14 | |
| | Roll rotational speed (r/min) Right | 10 | 3 | 4 | 8 | 10 | 1 | 2 |
| | Roll rotational speed (r/min) Left | 10 | 4 | 5 | 10 | 10 | 2 | 3 |
| | Roll rotational speed ratio | 1.00 | 0.75 | 0.80 | 0.80 | 1.00 | 0.5 | 0.67 |

TABLE 1-continued

|  |  | Comparative Example 1 | Example 1 | Example 2 | Example 3 | Comparative Example 2 | Example 4 | Example 5 |
|---|---|---|---|---|---|---|---|---|
| Result | Loose apparent density of granulated particles (g/cc)*2 | 0.22 | 0.39 | 0.39 | 0.30 | 0.16 | 0.30 | 0.36 |
|  | Processing power (kg/Hr) | 7 | 20 | 38 | 18 | 5 | 13 | 18 |
|  | Material biting property at time of introduction to kneader | C | A | A | B | C | B | A |
|  | Ratio of loose apparent density before and after granulation *2/*1 | 1.2 | 2.1 | 2.1 | 1.6 | 1.1 | 2.1 | 2.6 |

TABLE 2

|  |  | Comparative Example 3 | Example 6 | Example 7 | Example 8 |
|---|---|---|---|---|---|
| Condition | Loose apparent density of fine particle toner (g/cc)*1 | 0.20 | | | |
|  | Roll rotational speed (r/min) Right | 10 | 3 | 6 | 8 |
|  | Roll rotational speed (r/min) Left | 10 | 4 | 7 | 10 |
|  | Roll rotational speed ratio | 1 | 0.75 | 0.86 | 0.80 |
| Result | Loose apparent density of granulated particles (g/cc)*2 | 0.22 | 0.40 | 0.37 | 0.30 |
|  | Processing power (kg/Hr) | 8 | 23 | 36 | 14 |
|  | Material biting property at time of introduction to kneader | C | A | A | B |
|  | Ratio of loose apparent density before and after granulation *2/*1 | 1.1 | 2.0 | 1.9 | 1.5 |

TABLE 3

| * Common experiment conditions |  |
|---|---|
| Screw/agitator rotational speed (r/min) | 100 |
| Pulverizer rotational speed (r/min) | 300 |
| Particle sizer rotational speed (r/min) | 300 |
| Particle sizer opening (mm) | 8 (diameter) |

TABLE 4

| Material biting property at time of introduction to kneader |
|---|
| A  Material feeding state at kneader feed section is extremely good (OK) |
| B  Material feeding state at kneader feed section is good (OK) |
| C  There occurs spout of material from kneader feed section (NG) |

As can be seen from the results of the present Examples, even in the case where the fine particle toner containing additives having lubricant effect is used, when the rotational speeds of the press rolls are made different from each other, it is possible to prevent occurrence of the feed-neck, to increase processing power to a level more than twice that in Comparative examples, and to make granulating quality satisfactory. That is, a material that can be kneaded by a kneader without problems was obtained.

More specifically, as shown in Examples 1 to 3 for Comparative example 1, Examples 4 and 5 for Comparative example 2, or Examples 6 to 8 for Comparative Example 3, while the evaluations concerning the material biting property in Comparative examples 1 to 3 are all negative (there occurred feed-neck), the feed-neck did not occur in the Examples 1 to 8. Thus, it was proved that the problem of the feed-neck problem was eliminated in the toner manufacturing method according to the present invention. With regard to the processing power, while 7 kg/Hr processing power was obtained in Comparative example 1, 20 kg/Hr processing power, which is about three times that in Comparative example 1, was obtained in Example 1. In Example 2, 38 kg/Hr, which is more than five times that in Comparative example 1, was obtained. In Example 3, 18 kg/Hr, which is more than twice that in Comparative example 1, was obtained.

Further, while 5 kg/Hr processing power was obtained in Comparative example 2, 13 kg/Hr processing power, which is more than twice that in Comparative example 2, was obtained in Example 4. In Example 5, 18 kg/Hr, which is more than three times that in Comparative example 2, was obtained.

Further, while 8 kg/Hr processing power was obtained in Comparative example 3, 23 kg/Hr processing power, which is about three times that in Comparative example 3, was obtained in Example 6. In Example 7, 36 kg/Hr, which is four and half times that in Comparative example 3, was obtained. In Example 8, 14 kg/Hr, which is about twice that in Comparative example 3, was obtained.

When the granulated product obtained in Examples 1 to 8 were introduced into a kneader, a trouble (i.e., material does not bite into a kneader well) did not occur, thereby obtaining satisfactory productivity.

As shown in the above Examples and Comparative examples, in the present invention, the ratio (*2/*1=$\rho 2/\rho 1$) is preferably more than 1.2, and more preferably more than 1.2 and about 3.0 or less.

What is claimed is:

1. A method of producing a toner comprising:
    granulating a fine particle toner with a granulating apparatus so as to increase a loose apparent density of the fine particle toner from the range of 0.05 g/cc to 0.25 g/cc to the range of 0.30 g/cc to 0.60 g/cc,
    wherein the granulating apparatus comprises a left press roll and a right press roll having the same diameter and wherein the left press roll and the right press roll have a rotational speed ratio of 0.40 to 0.95, and wherein the left press roll or the right press roll is driven at a higher speed than the other and has a rotational speed of from 1 to 20 rpm.

2. The method of producing a toner according to claim 1, wherein the left press roll and the right press roll are inwardly rotated in such a direction as to press out the fine particle toner from a top to bottom direction relative to the left press roll and the right press roll.

3. The method of producing a toner according to claim 1, wherein the left press roll or the right press roll being driven at a higher speed than the other has a rotational speed of from 1 to 10 rpm, and
    wherein the left press roll and the right press roll are inwardly rotated in such a direction as to press out the fine particle toner from a top to bottom direction relative to the left press roll and the right press roll.

4. The method of producing a toner according to claim 2, wherein the granulating apparatus further comprises scrapers respectively disposed at lower portions of the left press roll and the right press roll so as to press the left press roll and the right press roll, and
    the granulating comprises feeding the fine particle toner between the left press roll and the right press roll, pressing the fine particle toner out from the left press roll and the right press roll, scraping the fine particle toner from the left press roll and the right press roll, pulverizing the fine particle toner scraped from the left press roll and the right press roll with a pulverizer, and sizing the pulverized toner with a particle sizer so as to produce a toner.

5. The method of producing a toner according to claim 1, wherein a ratio $\rho 2/\rho 1$ is more than 1.2 where $\rho 1$ is a loose apparent density of the granulated fine particle toner before the granulating and $\rho 2$ is a loose apparent density of the fine particle toner after the granulating, and the left press roll and the right press roll have diameters of 100 mm to 600 mm.

6. The method of producing a toner according to claim 1, wherein the granulating apparatus further comprises a hopper which comprises a fine particle supply tube, an agitator, and a screw, and
    wherein the fine particle supply tube is configured so that the fine particle toner is introduced into the hopper through the fine particle supply tube and is disposed at an upper portion of the hopper, and the agitator and the screw are disposed inside of the hopper.

7. The method of producing a toner according to claim 1, wherein the fine particle toner has a particle diameter failing to meet a predetermined standard diameter and is generated in pulverizing and classifying processes carried out for a toner material, and wherein the fine toner comprises at least a binder resin, a release agent and a pigment.

8. The method of producing a toner according to claim 1, wherein the left press roll and the right press roll are driven independently.

9. The method of producing a toner according to claim 8, wherein the left press roll and the right press roll are independently driven by a left drive unit and a right drive unit.

10. The method of producing a toner according to claim 9, wherein the left drive unit comprises a left speed changer which drives the left press roll and the right drive unit comprises a right speed changer which drives the right press roll.

11. The method of producing a toner according to claim 10, wherein the right speed changer is an inverter speed changer.

12. The method of producing a toner according to claim 10, wherein the left speed changer is an inverter speed changer.

13. The method of producing a toner according to claim 10, wherein the left speed changer and/or the right speed changer can suppress a reduction of the torque transmitted from the drive unit.

14. The method of producing a toner according to claim 1, wherein the rotational speed ratio between the left press roll and the right press roll is 0.50 to 0.90.

15. The method of producing a toner according to claim 1, wherein the rotational speed ratio between the left press roll and the right press roll is 0.75 to 0.85.

16. The method of producing a toner according to claim 1, wherein the distance between the left press roll and the right press roll is from 500 μm to 2000 μm.

17. The method of producing a toner according to claim 1, wherein the distance between the left press roll and the right press roll is from 800 μm to 1200 μm.

* * * * *